United States Patent [19]

Imanaka

[11] Patent Number: 5,105,406
[45] Date of Patent: Apr. 14, 1992

[54] TRACK-JUMPING SERVO APPARATUS FOR DISC-SHAPED OPTICAL RECORD MEDIUM

[75] Inventor: Ryoichi Imanaka, Hirakata City, Japan

[73] Assignee: Matsushita Electric Industrial Co., Ltd., Kadoma, Japan

[21] Appl. No.: 420,259

[22] Filed: Oct. 12, 1989

[30] Foreign Application Priority Data

Oct. 13, 1988 [JP] Japan ................... 63-257559

[51] Int. Cl.⁵ .............................................. G11B 7/00
[52] U.S. Cl. .......................... 369/44.28; 369/44.29; 369/44.32; 369/44.35
[58] Field of Search ............... 358/907; 369/44.11, 369/44.28, 44.29, 44.32, 44.35

[56] References Cited

U.S. PATENT DOCUMENTS 3,854,015  12/1974  Janssen .
4,799,206  1/1989   Imanaka ................. 369/44.21

*Primary Examiner*—Robert L. Richardson
*Attorney, Agent, or Firm*—Cushman, Darby & Cushman

[57] ABSTRACT

A gain crossover frequency in a tracking servo system for a disc-shaped optical record medium is lowered during an application of a track jump signal to the tracking servo system for jumping from one track to another, thereby removing the tracking jump operation from the servo system, and performing a sure-footed track jump operation; whereas, displacement of the scanning point, which is slower than the response speed corresponding to the lowered gain crossover frequency, is corrected even during the track jump operation.

2 Claims, 4 Drawing Sheets

TRACK-JUMPING SERVO APPARATUS FOR DISC-SHAPED OPTICAL RECORD MEDIUM

FIELD OF THE INVENTION AND RELATED ART STATEMENT

1. Feild of the Invention

The present invention relates to a tracking servo apparatus for controlling an optical read unit comprising a light source for reading a disc-shaped record medium on which signals are optically recorded in spiral or circular form.

2. Description of the Related Art

A disc-shaped record medium such as a compact disc is provided with an information track which is generally spiral and in which video and/or audio signals are recorded in optical form. The record medium is rotated by a motor via a spindle which passes through a center hole in the record medium. The information track is traced by an optical read means provided with a tracking servo system. Such a tracking servo control apparatus is described in U.S. Pat. No. 3,854,015, for example.

According to the prior art, the information track is detected by an optical read-detector, and the information present in the scanning point of a record carrier is read out. The read-detector comprises a measuring detector for measuring the radial position of the scanning point relative to a desired track and a control system for controlling the radial position of the scanning point on the desired track.

The information is read by means of a beam of radiation. This beam of radiation is produced, and after interaction with the record carrier, the information contained in it is detected by means of an optical system. This optical system comprises a source of light and a mirror by which the light from the source is collimated with the beam of radiation. The beam of radiation is reflected towards the record carrier by means of a planar mirror and focused, by use of a lens, onto the surface of the record carrier on which the information is recorded. The beam of radiation which, after being modulated by this information, emerges from the record carrier and is reflected via another lens and another planar mirror to a detector unit as a collimated beam of radiation. A scanned point of the record carrier thus is imaged onto the read detector which detects the information contained in the beam.

The control system comprises a first control loop which includes the measuring detector and a first driving device enabling the radial position of the read unit to be controlled, and a second control loop which includes the measuring detector and a second driving device enabling the angular position of a rotatable element, included in the directive system relative to the incident beam of radiation and hence the radial position of the scanning point to be controlled.

The two control loops ensure that the scanning point always accurately follows the information track on the carrier. In general, this information track is spiral, so that the scanning point is to be displaced in a radial direction at an approximately uniform speed. This uniform motion in general is effected by the first driving device, while the second driving device, generally, must be capable, by rotation of the rotatable element, of following rapid variations of the radial position of the information track, for example due to eccentricity of the pivot point relative to the center of the record carrier, in order to ensure continuous reading of the information track.

The object of the prior art has been to provide an apparatus of the aforementioned type which permits the information, in particular the video information, recorded on the record carrier to be displayed at a speed different from the recording speed by simple means. More particularly, where slow-motion or still pictures are concerned, however, quick-motion pictures or even reverse-motion pictures may be desired. For such purposes, the apparatus according to the prior art contains switching means which enables a switching cycle to be performed which comprises opening the second control loop, applying to the second driving device a control signal obtained from a signal source causing the second drive device to pivot the rotatable element through a given angle, and closing the control loop again.

The step according to the aforementioned prior art ensures that after a command the scanning point on the carrier jumps in a radial direction. The achieved result depends upon the repetition frequency of the command and the magnitude and the direction of the jump or displacement of the scanning point. If the record carrier contains a spiral information track which starts at the outer circumference, a still picture is obtained by displacing the scanning point outwardly through one track spacing after each revolution of the record carrier, so that the same portion of the information track is repeatedly scanned. If the record is to be displayed at half of the recording speed, the scanning point will be displaced outwardly through one track spacing after every other revolution. It will be clear that thus many modifications of the display speed are possible.

The embodiment of the apparatus of the prior art has utilized the said choice of the recording pattern by ensuring that a jump of the scanning point from one track to another is commenced at an instant which substantially corresponds to a frame flyback pulse in the recorded video signal, because in this recording pattern the portions of the information track which correspond to the frame flyback periods will be radially adjacent in successive tracks. By starting the jump of the scanning point at the beginning of such a frame flyback period of a track, the scanning point after the jump, provided that the jump is fast enough, falls in a corresponding frame flyback period recorded in the new track. This means that the jump of the scanning point entirely takes place in a period in which the image is suppressed, so that this jump does not introduce disturbances in the visible picture. Obviously, the starting pulses for the switching cycle may lay behind the frame flyback pulses to enable the old track to be followed during part of this frame flyback period in order to read certain information, such as information relating to the desired repetition frequencies and the like of the switching cycles.

Thus, it is ensured by means of the said control systems that the scanning point continuously follows the information track. If, for example, a still picture is to be displayed, the scanning point, after having followed the information track for a given time, for example for at least one period of revolution of the record carrier, will have to jump back at least one track spacing to enable the information to be repeatedly read. For this purpose a switching unit is provided which is capable of operating the switch. If this switching unit at its control input receives a starting signal, a switching cycle is started during which first the switch is changed over from a first position to a second position. This opens the tracking control servo loop for the radial position of the scanning point. Having been switched to the second position, the switching unit, via this switch and the servo-amplifier, applies to the driving unit a track jump signal so that the mirror is pivoted through an angle so that the scanning point jumps, approximately one track spacing. Subsequently the switching cycle is terminated in that the switching unit returns the switch to the first position, so that the control loop is closed again and the scanning point is maintained again on the new track.

In the above-mentioned prior art, the tracking servo control apparatus must be provided with such switching means for opening or closing the control loop for the period of the jumping step and voltage generating means for controlling motion of the mirror, and hence complicated configuration is required. Furthermore, since the servo loop is rendered to open or close every jump of the track, operation is slow when a plurality of tracks are jumped.

OBJECT AND SUMMARY OF THE INVENTION

An object of the present invention is to provide a tracking servo apparatus which enables a scanning point to jump tracks with a higher speed and to maintain stability in the servo apparatus for reading the disc-shaped record medium containing information in optical form.

The tracking servo apparatus for disc-shaped optical record medium in accordance with the present invention comprises:

a light source for emitting a radiation beam, an optical system for focusing the radiation beam onto a track of a record medium, a measuring detector for measuring the radial position of a scanning point of the beam of radiation relative to a desired track, a tracking servo system for controlling the radial position of the scanning point on the desired track, and a track jumping means for shifting the radial position of the scanning point of a track by means of applying a track jump signal, for jumping from one track to another track, having a time length which is shorter than a response time of the tracking servo system and corresponds inversely to a gain crossover frequency of the tracking servo system.

While the novel features of the invention are set forth particularly in the appended claims, the invention, both as to organization and content, will be better understood and appreciated, along with other objects and features thereof, from the following detailed description taken in conjunction with the drawings.

It will be recognized that some or all of the FIGURES are schematic representations for purposes of illustration and do not necessarily depict the actual relative sizes or locations of the elements shown.

DESCRIPTION OF THE PREFERRED EMBODIMENTS

Figure 1:
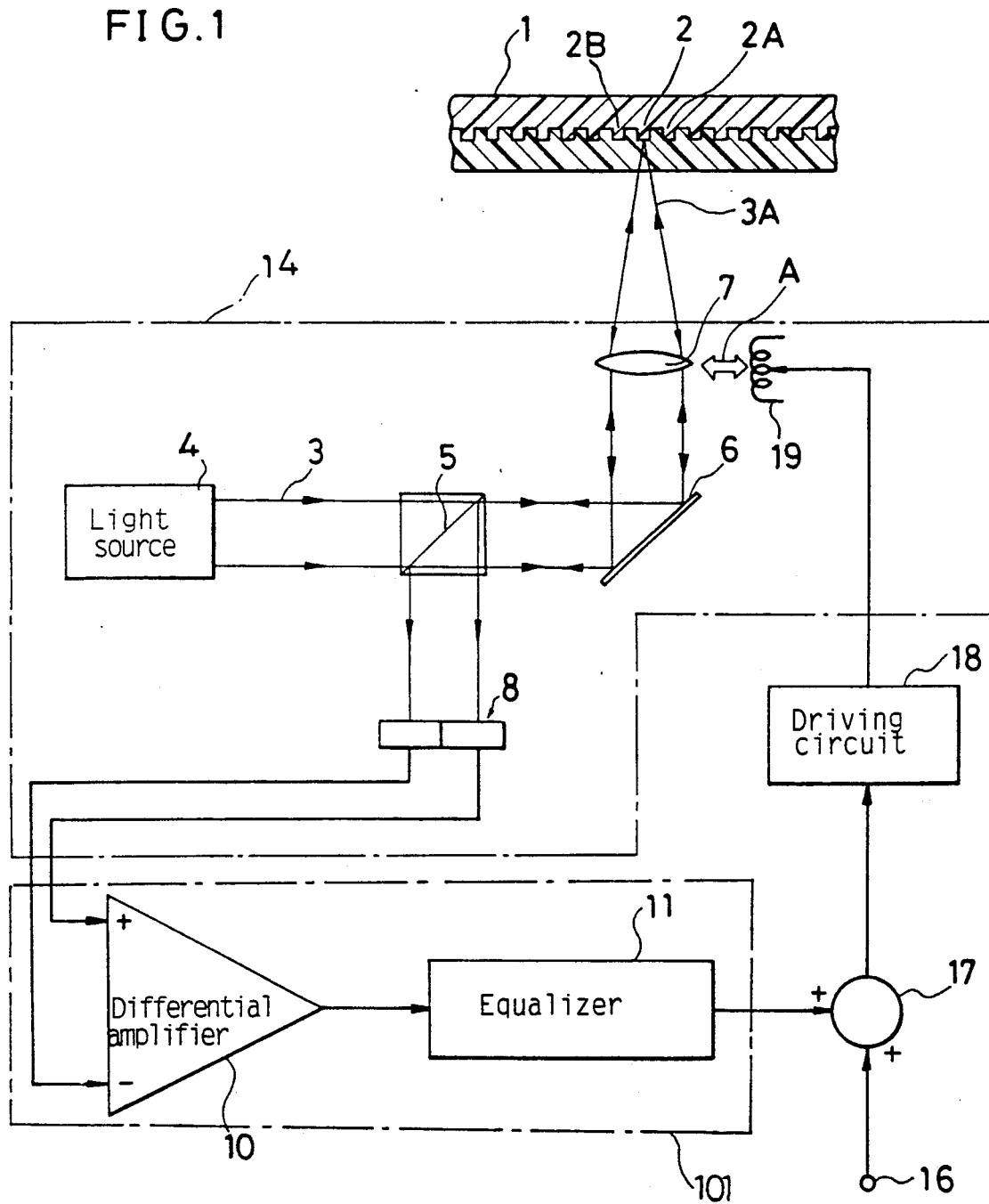
FIG. 1 is a circuit block diagram of a first embodiment of the tracking servo apparatus in accordance with the present invention.

FIG. 1 is a circuit block diagram of a first embodiment of the tracking servo apparatus in accordance with the present invention. Referring to FIG. 1, a beam 3 of radiation which is produced by a light source 4 is reflected towards a record medium 1, e.g. an optical recording disc, by means of a planar mirror 6 through a half-mirror 5 and focused by a lens 7 to make a convergent light beam 3A incident on the surface of the record medium 1 on which information was recorded in optical form. The light beam 3A is reflected by the record medium 1 towards the half-mirror 5 by means of the same planar mirror 6. Then the light beam is reflected towards a measuring detector 8 by mean of the half-mirror 5.

The measuring detector 8, comprising two measuring devices measures any small positional deviations from a track to be traced.

The information about the position of a scanning point relative to the information track, which information is required for the control, is obtained by means of the measuring detector 8. This measuring detector 8 also may be constructed in various manners, for example "Differential tracking error signal detection method" as described in U.S. Pat. No. 3,654,624.

Outputs derived from the respective measuring devices of the measuring detector 8 are applied to the inputs of a differential amplifier 10 for generating a tracking error signal which denotes a difference between both detected levels of the measuring devices. The tracking error signal is applied to an equalizer 11 for compensating the frequency response of the tracking serve loop. In general, a gain crossover frequency on which the gain of a servo system 101 is "0 db" is defined to represent a frequency response in the servo system. A track jump signal for activating a driving coil 19 which moves the lens 7 in the radial direction is applied to a second input 17B (see FIG. 3) of the adder 17 via a terminal 16 and is superimposed on the tracking error signal therein. A servo signal on the output 17C (see FIG. 3) of the adder 17 is amplified to enable it to activate the driving coil 19 by a driving circuit 18, and thereby the lens 7 is moved in the radial direction of the record medium 1 as shown by arrow A. The optical system and these circuits of the tracking servo apparatus are accommodated in a casing 14.

In the first embodiment, a time length of a track jump signal for accomplishing a track jump is selected to be shorter than the inverse value of the gain crossover frequency. In standard operation of the tracking servo apparatus in the embodiment, the gain crossover frequency of the equalizer 11 is sufficiently high so that the light beam 3A which is directed to the record medium is accurately controlled on the radial position of the scanning point on the desired track. In general, the information track is spiral, so that the scanning point is to be displaced in a radial direction at a relatively uniform speed during tracing of the track. Such displacement is carried out by moving the casing 14 to accommodate the optical system in the same radial direction as the record medium.

A track jump signal applied to the adder 17 via the terminal 16 is superimposed on the tracking error signal which is issued from the equalizer 11. Then the output 17C (see FIG. 3) of the adder 17 is amplified by the driving circuit 18 and is applied to the driving coil 19 for driving the lens 7. The lens 7 is moved in the direction of arrow A and the light beam focused on a track 2 is shifted onto another track.

Figure 2:
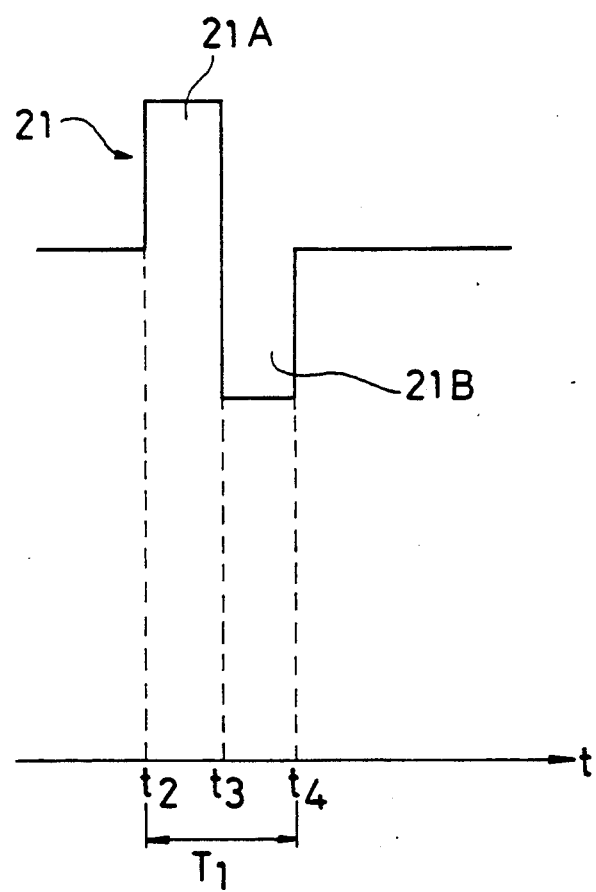
FIG. 2 is a waveform illustrating operation of the first embodiment.

Operation of the embodiment will be described with reference to FIG. 2. An accelerating signal 21A of a track jump signal 21 is applied at the time $t_2$, hence the light beam 3A in FIG. 1 is shifted in a rightward direction from a track 2 to a neighboring track 2A, for example. At the time $t_3$, a braking signal 21B which is inverted in its polarity relative to the accelerating signal 21A is applied. Thus, the light beam 3A is shifted onto the new track 2A. Therefore the track jump signal 21 serves as an accelerating signal 21A between the times $t_2$ and $t_3$ and serves as the braking signal 21B between the times $t_3$ and $t_4$.

In the track jump operation of this embodiment, once the track jump signal of a length shorter than the inverse value of the gain crossover frequency of the servo system, is applied, the servo system in the tracking servo apparatus does not affect the movement of the lens 7, and the lens 7 is moved only by the track jump pulse signal 21 supplied at the terminal 16.

Only after completion of the track jump operation does the tracking servo system 101 brings its servo operation into influencing movement of the lens 7. The time length $T_1$ from start to completion of track jump (from time $t_2$ to time $t_4$ in FIG. 2) may be selected to be equal to or shorter than the time length represented by the inverse value of the gain crossover frequency.

The actual tracking servo system 101 however may be quite complex on account of elevation of the gain at the gain crossover frequency in close loop characteristic as well as the number of track jumps required. Hence, the time $T_1$ is preferably approximately half the time length represented by the inverse value of the gain crossover frequency.

Figure 3:
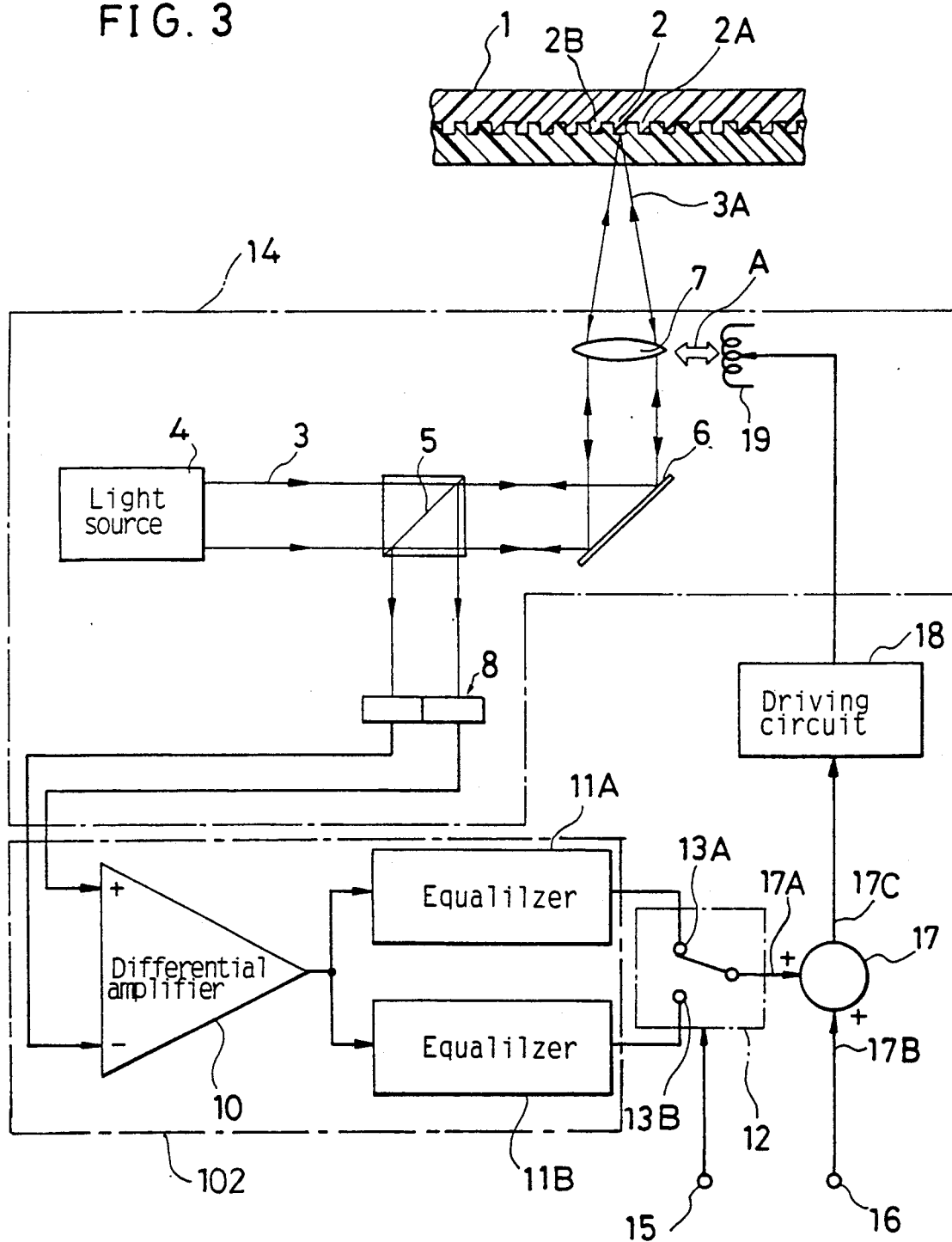
FIG. 3 is a circuit block diagram of a second embodiment of the tracking servo apparatus in accordance with the present invention.

FIG. 3 is a circuit block diagram of a second embodiment of the tracking servo apparatus in accordance with the present invention. In the second embodiment, the tracking servo apparatus comprises two equalizers 11A and 11B and a switch means 12. The remaining components functioning in the same manner as in the arrangement of FIG. 1 are designated by the numerals as used with corresponding parts shown in FIG. 1, and therefore will not be described.

The tracking error signal from the differential amplifier 10 is applied to both the equalizers 11A and 11B for compensating the frequency response of the tracking servo loop. In the second embodiment, the gain crossover frequency $f_1$ of the equalizer 11A is made to be higher than the gain crossover frequency $f_2$ of the equalizer 11B ($f_1 > f_2$). The outputs of the equalizers 11A and 11B are led to contacts 13A and 13B of a switch means 12, respectively, and are elected to a first input 17A of an adder 17 thereby. The switch means 12 is operated by a command signal applied via a terminal 15.

In the second embodiment, the gain crossover frequency of a servo system 102 is lowered while the scanning point jumps from one track to another. That is, the time for accomplishing track jump is selected to be shorter than the time period represented by the inverse number of the lowered gain crossover frequency. In standard operation of the tracking servo apparatus in this embodiment, the switch means 12 is changed to the contact 13A for receiving the output of the equalizer 11A. The gain crossover frequency $f_1$ of the equalizer 11A is sufficiently high so that the light beam which is irradiated to the record medium is accurately controlled on the radial position of the scanning point on the desired track.

On the other hand, the gain crossover frequency $f_2$ of the equalizer 11B is made to be lower than the gain crossover frequency $f_1$ and is 3 KHz in the embodiment, for example. The switch means 12 is activated by the command signal which is applied at the terminal 15 to command a track jump. When the switch means 12 is switched to the contact 13B by the command signal, the tracking servo apparatus serves as a servo system under the response time corresponding to the gain crossover frequency $f_2$. Then a track jump signal is applied to the adder 17 via the terminal 16 and is superimposed on the tracking error signal via the switch means 12. The output of the adder 17 is amplified by the driving circuit 18 and is applied to the driving coil 19 for driving the lens 7.

Figure 4A:
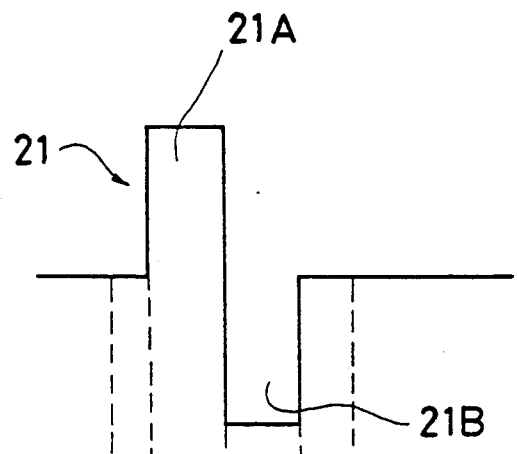
FIGS. 4(a) and 4(b) are waveforms illustrating operation of the second embodiment.
Figure 4B:
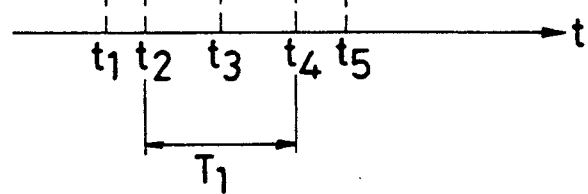

Operation of the embodiment will be described with reference to FIGS. 4(a) and 4(b). FIG. 4(b) shows a waveform of the track jump command signal, and thereby the status of switch 12 which is switched to the contact 13B during the time period from time $t_1$ to time $t_5$. Then, an accelerating signal 21A of the track jump signal 21 as shown in FIG. 4(a) is applied at the time $t_2$, hence the light beam 3A in FIG. 3 is shifted in a rightward direction from a track 2 to a neighboring track 2A, for example. At the time $t_3$ when the light beam 3A has passed the center of the neighboring two tracks 2 and 2A, a braking signal 21B which is inverted in its polarity relative to the accelerating signal 21A is applied. Thus, the light beam 3A is shifted onto the new track 2A. Therefore, the track jump signal 21 serves as an accelerating signal 21A between the times $t_2$ and $t_3$ and serves as the braking signal 21B between the times $t_3$ and $t_4$.

In the foregoing track jumping operation, since the gain crossover frequency $f_2$ is selected so that the time length represented by the inverse value of the gain crossover frequency $f_2$ is longer than the time length between the times $t_2$ and $t_4$, the servo system in the tracking servo apparatus does not bring its servo operation into movement of the lens 7, and the lens 7 is moved only by the track jump signal 21 supplied at the terminal 16.

In the second embodiment, the command signal as shown in FIG. 4(b) is allowed to disappear in concurrence with completion of the brake signal 21B of the track jump signal 21.

Although the invention has been described in its preferred form with a certain degree of particularity, it is understood that the present disclosure of the preferred form has been changed in the details of construction and the combination and arrangement of parts may be resorted to without departing from the spirit and the scope of the invention as hereinafter claimed.

What is claimed is:

1. A tracking servo apparatus for disc-shaped optical record medium comprising:
    a light source for emitting a light beam,
    an optical system for focusing and tracking said light beam on a target track of a record medium,
    a tracking error detecting means for detecting an error between a present position of said light beam on said optical disc and said target track on the basis of reflected light from said record medium,
    a tracking error signal generating means for generating a tracking error signal on the basis of an output of said tracking error detecting means, a tracking servo control means for driving said optical system in a manner that said light beam is applied to said target track on the basis of said tracking error signal, and track jump signal superimposing means for superimposing a track jump signal which is equal to or shorter in time duration than a periodic time which is represented by an inverse value of a gain crossover frequency of said tracking servo control means during operation of said tracking servo control means.

2. A tracking servo apparatus in accordance with claim 1, wherein:

said tracking servo system control means further comprises a first equalizer having a first gain crossover frequency, a second equalizer having a second gain crossover frequency which is lower than that of said first equalizer and switching means for selecting said second equalizer during receiving said track jump signal.

* * * * *